United States Patent Office 2,816,125

Patented Dec. 10, 1957

2,816,125

ESTERS OF METHANE SULFONIC ACID

Charles F. H. Allen and Thomas T. M. Laakso, Rochester, N. Y., assignors to Eastman Kodak Company, Rochester, N. Y., a corporation of New Jersey No Drawing. Original application December 1, 1951, Serial No. 259,511, now Patent No. 2,726,162, dated December 6, 1955. Divided and this application June 24, 1955, Serial No. 517,938

10 Claims. (Cl. 260—456)

This is a divisional application of application Serial No. 259,511 filed December 1, 1951, now U. S. Patent No. 2,726,162.

This invention relates to bis esters of methane sulfonic acid as new compounds. These compounds have the formula:

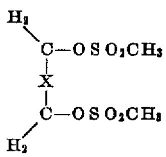

where X is either $—CH_2—O—CH_2—$ or $(CH_2)_{0-4}$. These compounds are eminently suitable for the hardening of gelatin. For instance, by incorporating small amounts of this compound in gelatin compositions the gelatin layers or gelatin emulsion layers prepared therefrom are capable of resisting swelling or melting especially at a relatively elevated temperature.

It is the object of our invention to prepare new chemical compounds which are useful particularly in the photographic industry. Another object of our invention is to provide novel bis esters of methane sulfonic acid. Other objects of our invention will appear herein.

Compounds in accordance with our invention are conveniently prepared by reacting an aliphatic dihydroxy compound with methane sulfonyl chloride in the presence of an organic base such as pyridine under substantially anhydrous conditions. The following examples illustrate the preparation of compounds in accordance with our invention.

*Example 1.—1,2-di-(methanesulfonoxy)-ethane*

310 parts of dry ethylene glycol was dissolved in 1500 parts of dry pyridine, and 1150 parts of methanesulfonyl chloride was slowly added to this solution with vigorous stirring. The temperature of the system was maintained between 5 and 15° C. After the reaction was completed the mass was stirred into three times its volume of finely crushed ice. The crystalline product which separated was washed with ice water and then dried. The product was obtained in the form of white crystals having a melting point of 45–47° C. and a yield of 77% of theoretical.

*Example 2.—1,2-di-(methanesulfonoxy)-propane*

152 parts of trimethylene glycol was dissolved in 600 parts of dry pyridine, and 460 parts of methanesulfonyl chloride was slowly added thereto while vigorously agitating and maintaining the temperature between 5 and 15° C. After the reaction was completed the mass was stirred into three times its volume of finely crushed ice. The crystals obtained were washed with ice water and dried. These crystals were recrystallized from ethyl alcohol. The crystals obtained had a melting point of 41–42° C.

*Example 3.—1,5-di-(methanesulfonoxy)-pentane*

312 parts of pentanediol 1,5- was dissolved in 2000 parts of dry pyridine, and 684 parts of methanesulfonyl chloride was added to this solution with vigorous stirring while the temperature was maintained between 5 and 15° C. After the reaction was completed, the mass was stirred into three times its volume of finely crushed ice. The crystalline product which separated was washed with ice water and dried. White crystals were obtained having a melting point of 35–36° C.

*Example 4.—β,β'-Di-(methanesulfonoxy)-diethyl ether*

212 parts of dry diethylene glycol was dissolved in 1200 parts of dry pyridine, and 460 parts of methanesulfonyl chloride was slowly added to the solution with vigorous agitating while maintaining the temperature between 5 and 15° C. After completion of the reaction the mass was stirred into three times its volume of finely crushed ice and the crystalline product was purified as in the preceding examples. White crystals were obtained having a melting point of 57–58° C.

The various compounds prepared as above were used for hardening gelatin by adding to 200 cc. portions of a photographic emulsion containing approximately 15½ grams of gelatin, 0.025 gram and 0.25 gram respectively of the compound in solution in methanol. Also, a control coating was made with the same emulsion but without hardener. After coating the emulsion upon a support therefor, the coated support was incubated one day at 100° F. and 50% R. H. to complete the hardening process. The degree of hardening was then determined by immersing the coatings in water at 70° F. and gradually raising the temperature to the point at which the coating disappeared from the support, the rate of increase in temperature being the same in all tests, and the water being stirred during the process. Whereas it was found that although the control coatings disappeared from the support (melted) within the range of 110–122° F. when 0.25 gram of the hardener was used, the coating still remained thereon although the temperature reached the boiling point of the water. When 0.025 gram of the hardener was employed, the coatings were not removed from the support until the temperatures indicated below were reached:

| | ° F. |
|---|---|
| 1,2-di-(methanesulfonoxy)-ethane | 131 |
| 1,3-di-(methanesulfonoxy)-propane | 211 |
| 1,5-di-(methanesulfonoxy)-pentane | 145 |
| β,β-Di-(methanesulfonoxy)-diethyl ether | 180 |

*Example 5.—1,6-di-(methanesulfonoxy)-hexane*

50 parts of hexamethylene glycol was dissolved in 180 parts of dry pyridine, and 98 parts of methanesulfonyl chloride was slowly added to this solution while vigorously stirring and maintaining the temperature between 5° and 15° C. After the reaction was completed, the reaction mixture was stirred into 3 times its volume of crushed ice. The crystalline product obtained was washed with ice water and dried. It was purified by recrystallization from ethyl alcohol. The product obtained had a melting point of 57°–58° C.

The above-prepared 1,6-di-(methanesulfonoxy)-hexane was employed as a hardener in photographic emulsions in the following manner: To 200 cc. portions of a silver halide-gelatin photographic emulsion containing about 8% gelatin was added methyl alcohol solutions of 1,6-di-(methanesulfonoxy)-hexane containing respectively 0.1, 0.2 and 0.4 gram thereof. The emulsions so prepared were coated onto glass plates, dried and were then conditioned by treating at 72° F. and 50% relative humidity, followed by heat sealing in foil bags and heating for 24 hours at 100° F. The melting points of these emulsion coatings were then determined in a water bath by bringing the temperature to 212° F. and holding for a maximum of 20 minutes, unless, of course, melting occurs sooner. The melting temperatures of the coatings were as follows, a coating containing no hardener being included as a check.

| 1,6-di-(methanesulfonoxy)-hexane per 200 cc. emulsion | M. P. | Minutes held at 212° F. |
|---|---|---|
| 0 | 110 | |
| 0.1 g | 212 | 14 |
| 0.2 g | 212 | 18 |
| 0.4 g | 212 | 16 |

The speed and contrast of the coatings containing the 1,6-di-(methanesulfonoxy)-hexane were satisfactory, it being found that the presence of this material had no adverse effect upon the properties of the emulsion.

We have found that instead of the incubation treatment the gelatin coating may be allowed to stand for some time at ordinary temperature, whereupon it becomes resistant to the effects of boiling water. For instance, 0.05 gram of 1,5-di-(methanesulfonoxy)-pentane was added to 200 cc. of emulsion as described above, and was coated out on a support, and the emulsion layer was kept for at least 14 days at 70° F., whereupon the resulting layer was found to resist the melting effect of boiling water.

We claim:

1. The compound having the formula:

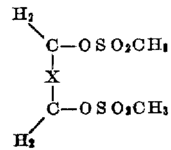

wherein X is selected from the group consisting of $(CH_2)_{0-4}$ and $—CH_2—O—CH_2—$.

2. 1,2-di-methanesulfonoxy-ethane.

3. 1,3-di-methanesulfonoxy-propane.

4. 1,5-di-methanesulfonoxy-pentane.

5. A method of preparing a di-methanesulfonoxy-alkane which comprising reacting at 5–15° C. an alcohol selected from the group consisting of the alkyl dihydroxy alcohols of 2–6 carbon atoms and diethylene glycol with methane sulfonyl chloride in solution in dry pyridine.

6. A method of preparing di-methanesulfonoxy-ethane which comprises reacting at 5–15° C. ethylene glycol with methane sulfonyl chloride in solution in dry pyridine.

7. A method of preparing dimethanesulfonoxy-propane which comprises reacting at 5–15° C. 1,2-trimethylene glycol with methane sulfonyl chloride in solution in dry pyridine.

8. A method of preparing dimethanesulfonoxy-pentane which comprises reacting at 5–15° C. 1,5-pentane diol with methane sulfonyl chloride in solution in dry pyridine.

9. A method of preparing dimethane-sulfonoxy-diethyl ether which comprises reacting at 5–15° C. diethylene glycol with methane sulfonyl chloride in solution in dry pyridine.

10. A method of preparing dimethanesulfonoxy-hexane which comprises reacting at 5–15° C. 1,6-hexamethylene glycol with methane sulfonyl chloride in solution in dry pyridine.

References Cited in the file of this patent

UNITED STATES PATENTS

| | | |
|---|---|---|
| 2,172,606 | Butler et al. | Sept. 12, 1939 |
| 2,266,141 | Adams | Dec. 16, 1941 |
| 2,412,116 | Baker | Dec. 3, 1946 |
| 2,581,443 | Reynolds et al. | Jan. 8, 1952 |

OTHER REFERENCES

Chapman et al.: J. Chem. Soc., pgs. 579–85 (1950), pgs. 582–83 relied on.

Loveless et al.: Nature, 166, pgs. 113–14, Dec. 30, 1950.

Laakso et al.: J. Amer. Chem. Soc., 73, pgs. 3518–20 (1951), article received for publication March 22, 1951.

UNITED STATES PATENT OFFICE
Certificate of Correction

Patent No. 2,816,125 December 10, 1957

Charles F. H. Allen et. al.

It is hereby certified that error appears in the printed specification of the above numbered patent requiring correction and that the said Letters Patent should be read as corrected below.

Column 2, line 50, Example 4, for "$\beta$", second occurrence, read —$\beta'$—; column 4, line 4, for "comprising" read —comprises—.

Signed and sealed this 4th day of March 1958.

[SEAL]

Attest:
KARL H. AXLINE,
*Attesting Officer.*

ROBERT C. WATSON,
*Commissioner of Patents.*